United States Patent [19]

Shriver et al.

[11] Patent Number: 4,775,564
[45] Date of Patent: Oct. 4, 1988

[54] COLLAPSIBLE-STABLE BLOWN CONTAINER

[75] Inventors: Clem B. Shriver, Clinton; Donald E. Richeson, N Canton; Robert H. Vogliano, Tallmadge, all of Ohio

[73] Assignee: The Goodyear Tire & Rubber Company, Akron, Ohio

[21] Appl. No.: 710,773

[22] Filed: Mar. 11, 1985

[51] Int. Cl.⁴ .................. B27N 5/02; B65D 23/00
[52] U.S. Cl. .................. 428/35; 215/1 A; 215/1 C; 206/21 F; 220/83; 220/DIG. 13; 220/DIG. 14; 138/119; 138/121; 222/95; 222/107; 222/215
[58] Field of Search .......... 222/107, 215, 95; 206/218; D7/42; 138/119, 121; 220/83, DIG. 13, DIG. 14; 221/65; 215/1 A, 1 C; 150/55; 428/35

[56] References Cited

U.S. PATENT DOCUMENTS

| D. 214,150 | 5/1969 | Nardone | D7/42 |
|---|---|---|---|
| 3,390,281 | 7/1968 | Mullan | 222/212 |
| 3,908,704 | 9/1975 | Clement et al. | 138/121 |
| 4,036,392 | 7/1977 | Martin | 215/1 A |
| 4,187,960 | 2/1980 | Bonk | 222/107 |
| 4,256,789 | 3/1981 | Suzuki et al. | 428/35 |
| 4,288,478 | 9/1981 | Kinoshita et al. | 428/35 |
| 4,356,927 | 11/1982 | Cooper et al. | 215/1 A |
| 4,456,134 | 6/1984 | Cooper | 215/12 R |
| 4,492,313 | 1/1985 | Touzani | 215/1 C |
| 4,515,842 | 5/1985 | Kovacs | 428/36 |
| 4,526,296 | 7/1985 | Berger et al. | 222/107 |

Primary Examiner—John E. Kittle
Assistant Examiner—P. J. Ryan
Attorney, Agent, or Firm—Alvin T. Rockhill; J. D. Wolfe

[57] ABSTRACT

A molded extensible-collapsible container having a series of flutes, in the generic sense, in its side to permit the container when subjected to an external force to move to a collapsed position or to the extended position when preferably the yield point of the plastic is no greater than about 5% and it has an ASTM modulus of elasticity greater than about $(6.895 \times 10^8$ pascals) and less than about $(2.758 \times 10^9$ pascals) and preferably about $(1.034 \times 10^9$ pascals to $2.069 \times 10^9$ pascals). The plastic of the blow molded container can be a blow moldable polyester of less than 5% elongation at yield with polyethylene terephthalate being most preferred.

10 Claims, 3 Drawing Sheets

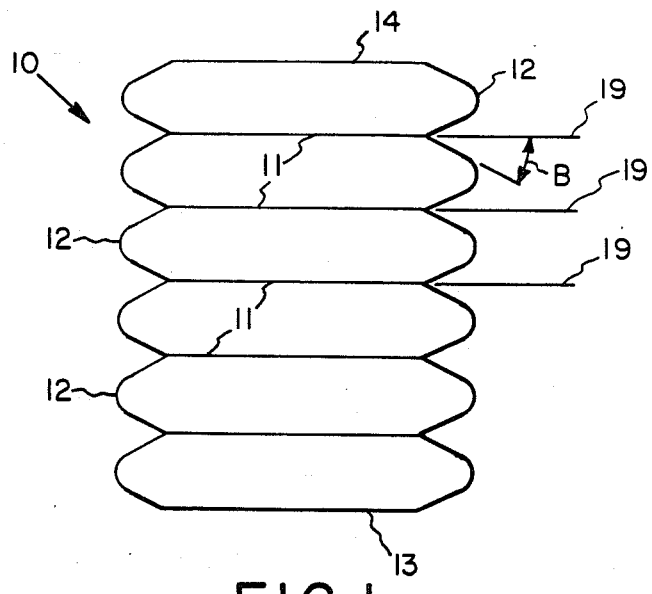
FIG. 1
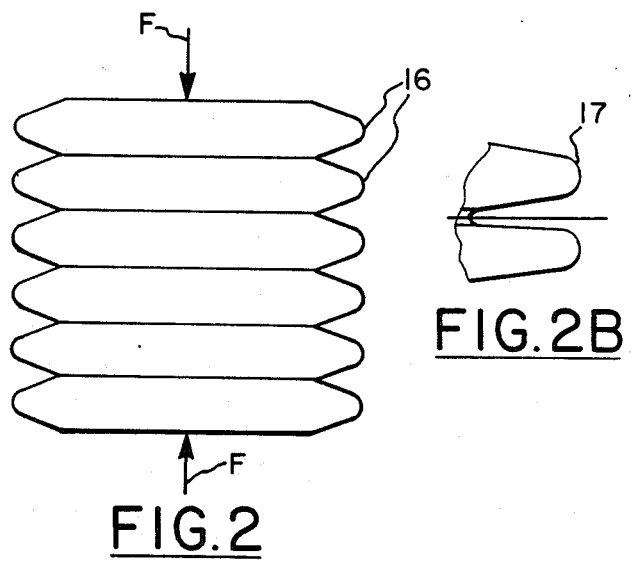
FIG. 2
FIG. 2B
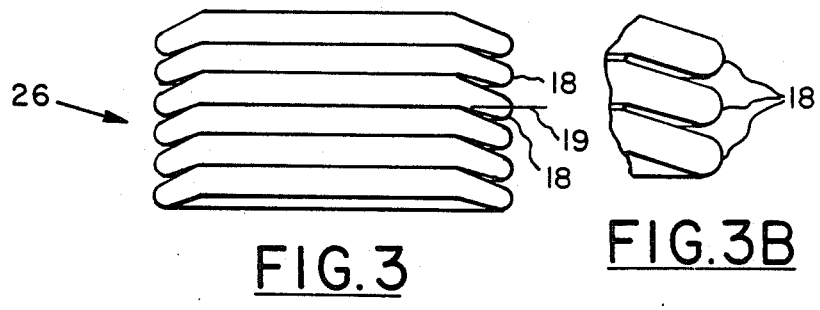
FIG. 3
FIG. 3B

COLLAPSIBLE-STABLE BLOWN CONTAINER

TECHNICAL FIELD

This invention relates to a molded collapsible container that is free standing in the extended position and collapses to a free standing collapsed position, usually referred to as the minimum compressed height. In the minimum compressed height position the container is stable and requires no external forces to maintain this configuration.

More particularly, this invention relates to blow molded collapsible containers of the bottle type that has an extended position and a collapsed position. The container remains in these positions until effected by application of a disturbing force.

PRIOR ART

Collapsible containers are known. These use soft sidewalled material. Generally they are not free standing unless filled. Consequently, these containers must be held during filling because of their unstable nature when empty and generally, use a cup or retainer member on the bottom to cause the containers to stand upright as illustrated by conventional one and three liter plastic pop bottles.

DISCLOSURE OF THE INVENTION AND ITS BEST MODE

We have discovered that a container can be made which is free standing in both the collapsed and non-collapsed position without the need for a support cap and thus can be filled without being held. This container has a series of pleats or flutes in the sidewalls hereinafter called flutes in its broadest sense as illustrated in the drawings. The number of flutes determines the degree of collapse of the container for use in the collapsed or the stacking position. It is preferred that the shape of the flutes be chosen to give the flutes a position which is stable in the so-called free standing condition, viz the extended to maximum height position and also in the collapse position.

The nature of this invention and its preferred embodiments can be more readily understood and appreciated by reference to the drawings where FIG. 1 is a schematic view in elevation of the container in the extended free standing position.

FIG. 2 is a view of the container of FIG. 1 being compressed by the force F with a pair of the flutes being shown in enlargement to facilitate the understanding of the effect of force F on the flutes.

FIG. 3 is a view of the container of FIG. 1 that has been compressed to cause the flutes to assume the stable state as a result of the compression to the collapsed state which requires no external force to retain this shape. Some of the flutes are shown in enlargement to illustrate movement of the flutes relative to the horizontal plane.

Figure 4:
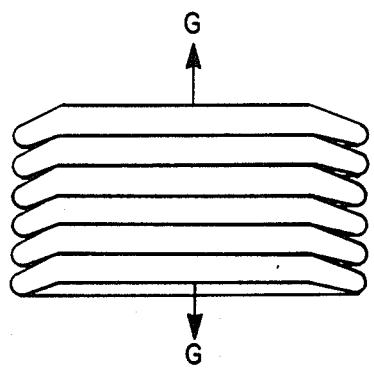
FIG. 4 shows how application of an extension force G returns the container to the position of FIG. 1.

Referring to the drawings the containers could be made by blow molding a parison, usually called a preform in polyester technology of a suitable polyester, preferable polyethylene terephthalate. The side of the container 10 are blown to have the shape shown in FIG. 1 where numeral 11 indicates the flutes or pleats in the sidewalls 12 of the container and numeral 13 and 14 indicates the bottom and top respectively of the container. It should be appreciated that the container has at least one opening 15 such as that shown in FIG. 5 to fill or empty the container or the two openings 24 and 25 of FIG. 6. Also, it may be desirable to have the openings in the same end. This opening may be closed with a suitable stopper means, viz, a cork or related material stopper, a cap of metal or plastic.

Referring again to the drawings and especially to the specific figures thereof, the nature of the flutes or pleats may be seen more readily and their function understood by referring to the enlarged views of FIGS. 2 and 3. It is preferred that the side wall portions 16 be rounded as this reduces the stress and permits these sidewall portions 16 to move more readily from the normal or extended positons 17, best seen in the enlargement of FIG. 2, to the collapsed position 26 of the container where the sidewall portions occupies the position 18 best seen in the enlargement of FIG. 3.

FIG. 1 has a series of horizontal flute lines 19 marked thereon to facilitate the description of the relationship of the flute angle, depth ratio, wall thickness, the longest radii of the sidewall portion (also called the out radius) and the shortest radii of the flute (also called the in radius). For example, when the plastic of the thin gauge walls are about 0.33 to 0.46 millimeters the flute angle B is preferably about 35°, the out radius is 2.4 millimeters and the in radius is 0.8 millimeters.

It should be noted that the drawings show the flute coming to a point, for simplicity sake, whereas in actual practice they are curved to facilitate blowing to fit the mold.

When compressive force F is applied to the container as shown in FIG. 2, this causes the container sidewall flutes to be compressed. Thus, stress is building due to the low elastic properties of the fluted material being deformed. As the force F increases a point in compression is reached at which the flutes snap through to a lower stress state, as shown in FIG. 3, resulting in a stable collapsed configuration requiring no external forces to retain this shape. It should be noted that the flutes have moved downward in this position whereby the ends 21 of the flutes are below the pleat line 19.

Generally, the blown plastic material of which the container is molded has an elongation at the yield point sufficient to yield but less than 5% and an ASTM modulus of elasticity greater than about 100,000 psi ($6.895 \times 10^8$ pascals) and less than about 400,000 psi ($2.758 \times 10^9$ pascals) and preferably about 150,000 psi ($1.034 \times 10^9$ pascals) to 300,000 psi ($2.069 \times 10^9$ pascals). Preferably, the plastic has an elongation at the yield point of 0.5 to 5% and most preferred of about 1 to 4%. The blow moldable polyesters of about 0.5 to 5% elongation at yield may be used. Polyethylene terephthalate having an elongation at yield of about 0.5 to 1 is well suited for this purpose. Preferably the plastic is oriented viz stretched in the width and length direction.

Figure 5:
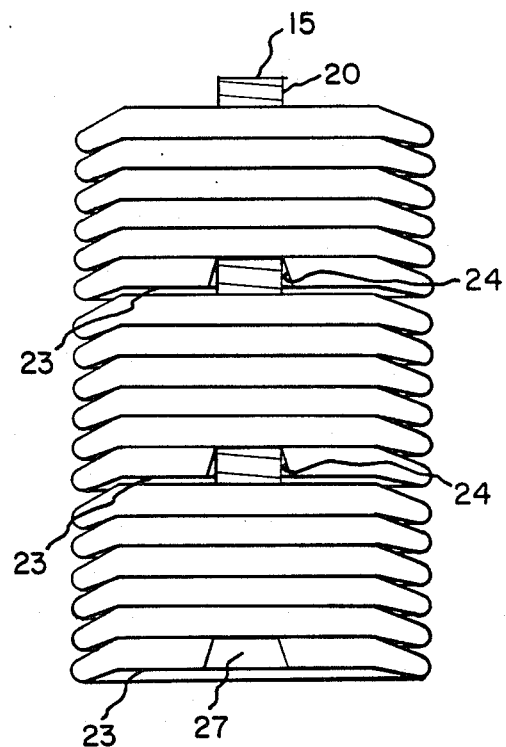
FIG. 5 shows a series of containers having special nesting embodiments in the stacked position.

In FIG. 5 three containers are shown stacked one on another. Each container has a filling opening 15 in neck 20 that can fit into the nesting feature 27 of the container bottom 23. This feature permits the empty container to be stored and shipped in less space.

Figure 6:
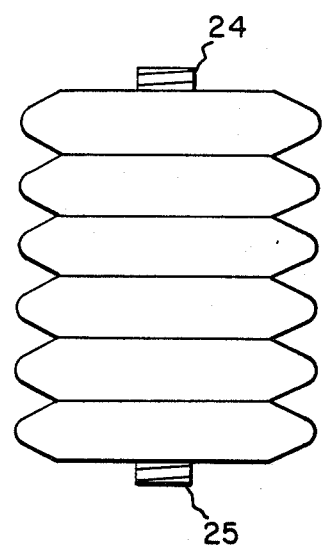
FIG. 6 shows a fully extended container having two filling openings, one in the top and one in the bottom thereof.

FIG. 6 shows a special emhodiment having two openings 24 and 25 respectively in the top and bottoms.

This embodiment can be used as a surge apparatus in a low pressure hydraulic system.

The containers of the drawings are shown as essentially a blown preformed bottle or cylinder, but with the appropriate shaped mold the blown shape can be a square, a rectangle, or a suitable polygon.

While certain representative embodiments and details have been shown for the purpose of illustrating the invention, it will be apparent to those skilled n this art that various changes and modifications may be made therein without departing from the scope of the invention.

What is claimed is:

1. A molded extensible-collapsible plastic container having a series of pleats or flutes in its side to permit the container to be stable in its extended position and in its collapsed position, said extended position having ends of each pair of flutes or pleats displayed essentially evenly above and below a horizontal line through shortest radius of said pair and said collapsed position having the end of said top flute or pleat of said pair moved downward below said horizontal line of said pair, said plastic having an ASTM modulus of elasticity sufficient to yield, but greater than $6.895 \times 10^8$ and less than $2.069 \times 10^9$ pascals.

2. The plastic container of claim 1 wherein the plastic is a blow moldable polyester.

3. The container of claim 2 wherein the polyester is a polyethylene terephthalate.

4. The container of claim 1 wherein the plastic is an oriented polyester.

5. The container of claim 4 wherein the plastic is an oriented polyethylene terephthalate.

6. The container of claim 1 wherein the plastic is blow moldable and has an elongation of less than 5% at the yield point.

7. The plastic container of claim 1 wherein side walls of adjacent pair of flutes forms essentially equal angles about the pleat line of said pair.

8. The plastic container of claim 1 wherein sides of each adjacent pair of flutes form essentially equal angles with pleat line through said pair.

9. The container of claim 6 wherein sides of each adjacent pair of flutes form essentially equal angles with pleat line through said pair.

10. The container of claim 1 wherein the flutes have longest radii of each flute forms a rounded side wall portion.

* * * * *